United States Patent
Anderson et al.

(10) Patent No.: US 8,176,339 B2
(45) Date of Patent: *May 8, 2012

(54) METHOD AND SYSTEM FOR MANAGING PERIPHERAL CONNECTION WAKEUP IN A PROCESSING SYSTEM SUPPORTING MULTIPLE VIRTUAL MACHINES

(75) Inventors: Gary Dean Anderson, Austin, TX (US); Hoa Cong Nguyen, Austin, TX (US); Thoi Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1141 days.

This patent is subject to a terminal disclaimer.

(21) Appl. No.: 11/840,769

(22) Filed: Aug. 17, 2007

(65) Prior Publication Data

US 2008/0201710 A1 Aug. 21, 2008

Related U.S. Application Data

(63) Continuation of application No. 10/916,974, filed on Aug. 12, 2004, now Pat. No. 7,346,792.

(51) Int. Cl.
*G06F 1/32* (2006.01)
(52) U.S. Cl. ........ 713/300; 713/310; 713/320; 713/321; 713/322; 713/323; 713/324; 713/330; 713/340; 709/229
(58) Field of Classification Search .................. 713/300, 713/310, 320–324, 330, 340; 709/229
See application file for complete search history.

(56) References Cited

U.S. PATENT DOCUMENTS

| 6,978,455 | B1 * | 12/2005 | Borkowski et al. ............... 718/1 |
| 7,171,568 | B2 | 1/2007 | Dayan et al. |
| 7,216,175 | B1 | 5/2007 | Sitaraman et al. |
| 7,346,792 | B2 * | 3/2008 | Anderson et al. ............. 713/323 |
| 2005/0066022 | A1 | 3/2005 | Liebenow |
| 2008/0092137 | A1 * | 4/2008 | Anderson et al. ................. 718/1 |

* cited by examiner

*Primary Examiner* — M Elamin
(74) *Attorney, Agent, or Firm* — Mitch Harris, Atty at Law, LLC; Andrew M. Harris; Matthew B. Talpis

(57) ABSTRACT

A method and system for managing peripheral connection wakeup signaling in a processing system supporting multiple virtual machines provides a mechanism by which ownership of a peripheral having system wakeup capability is transferred between virtual machines. The power management event signal is connected to a service processor input that in turn signals a hypervisor to direct the wakeup activity to a particular logical partition in which the virtual machine was last executing. The hypervisor can then determine whether or not to wake up the entire system, or portions thereof and can direct the power management event to the appropriate virtual machine. In particular the peripheral may be an Ethernet adapter supporting Wake-On-LAN capability. State initialization, which is typically ensured by system power cycling is provided instead by controlling power to the standby power source or in some instances by forcing an indication of a disconnect/reconnect of the wakeup signaling connection.

21 Claims, 3 Drawing Sheets

METHOD AND SYSTEM FOR MANAGING PERIPHERAL CONNECTION WAKEUP IN A PROCESSING SYSTEM SUPPORTING MULTIPLE VIRTUAL MACHINES

The present U.S. Patent Application is a Continuation of U.S. patent application Ser. No. 10/916,974 filed on Aug. 12, 2004 and issued as U.S. Pat. No. 7,346,792 on Mar. 18, 2008, by the same inventors and assigned to the same Assignee and Claims benefit of priority therefrom under 35 U.S.C. §120.

BACKGROUND OF THE INVENTION

1. Technical Field

The present invention relates generally to power management and peripheral connection wakeup signaling, and more particularly, to peripheral connection wakeup power management in a processing system supporting multiple virtual machines.

2. Description of the Related Art

Present-day computing systems, and in particular large-scale server systems, often include support for running multiple virtual machines. The system may be a large-scale on-demand server system that executes hundreds of server instances on a single hardware platform to support customers with varying computing requirements. In the most flexible of these systems, multiple partitions, which may differ in operating system and application mix, are concurrently present in system memory and processes executing in each partition are run in an environment that supports their execution on a guest operating system. The virtual machine provides an environment similar enough to a real hardware platform that the operating system can run with little or no modification. A hypervisor (sometimes referred to as a virtual machine monitor) manages all of the virtual machines or partitions and abstracts system resources so that each partition provides a machine-like environment to each operating system instance. Peripherals connected to the system can be transferred between logical partitions, as the hardware interface is common amongst the virtual machines. Typically peripherals such as network adapters are transferred instead of shared, as the state of the adapter must be completely reset before hand-off between virtual machines and network activity may be present that will alter the state of the adapter during transfer. Therefore, multiple partition systems such as those described above usually assign a particular partition to an adapter such as an Ethernet adapter and do not permit transfer of ownership between partitions.

Power management in multiple partition systems is a complex task and introduces several complications with respect to strategies, components and subsystems designed for a single-partition system. In particular, wakeup signaling provided by a peripheral connection such as a Wake-On-LAN enabled Ethernet connection can be handled by the fixed partition assignment mentioned-above, but it would be desirable to transfer ownership of an Ethernet adapter between logical partitions. However, the typical connection of Wake-On-LAN detection circuitry in an Ethernet adapter (and other similar adapters that can cause recovery from a power-down state) is a signal line provided directly to the system power supply that causes the system power to be restored, causing a complete system restart. Further examples exist of peripheral connections having wakeup power management capability. U.S. Pat. No. 6,622,178, the specification of which is incorporated herein by reference, describes a mechanism for powering up or resuming operation of a computer system in response to activity on a universal serial bus (USB) connection.

In a multiple partition system, the entire system may or may not be powered down, some partitions may be active, and depending on the desired use of the Wake-On-LAN indication, only the logical partition owning the adapter receiving the Wake-On-LAN signal (or other similar wakeup peripheral signal) may be affected. Also, if the system is powered down, it may not be desirable to have the entire system brought back on line if the logical partition owning the adapter receiving the wakeup signal is considered low priority.

Therefore, it would be desirable to provide a mechanism for managing peripheral connection wakeup and ownership in a processing system supporting multiple virtual machines.

SUMMARY OF THE INVENTION

The objectives of providing a mechanism for managing peripheral connection wakeup and ownership in a processing system supporting multiple virtual machines is provided in a method, system and computer program product.

The method and system receive a wakeup event at an adapter that accepts the peripheral connection and a service processor and a power management event signal is generated by the adapter. The power management event signal is sent to a service processor that notifies the hypervisor managing the multiple virtual machine environments that a wakeup event has occurred with respect to the logical partition owning the adapter. The hypervisor then handles the power management event by taking appropriate action with respect to the logical partition, starting the virtual machine if the virtual machine is non-existent or resuming operation if the virtual machine is suspended. A power management event can also be simulated in the virtual machine that has been affected. Transfer of the adapter between virtual machines is accomplished by removing standby power from the adapter without removing standby power to the system and/or by simulation of a power cycle that causes complete re-initialization of the adapter. The hypervisor may be an owner of the adapter if no other virtual machine owns the adapter, in which case the hypervisor manages system power in response to a power management event without directing the event to a particular virtual machine. The above-described method may be embodied in a computer program product in accordance with an embodiment of the present invention.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
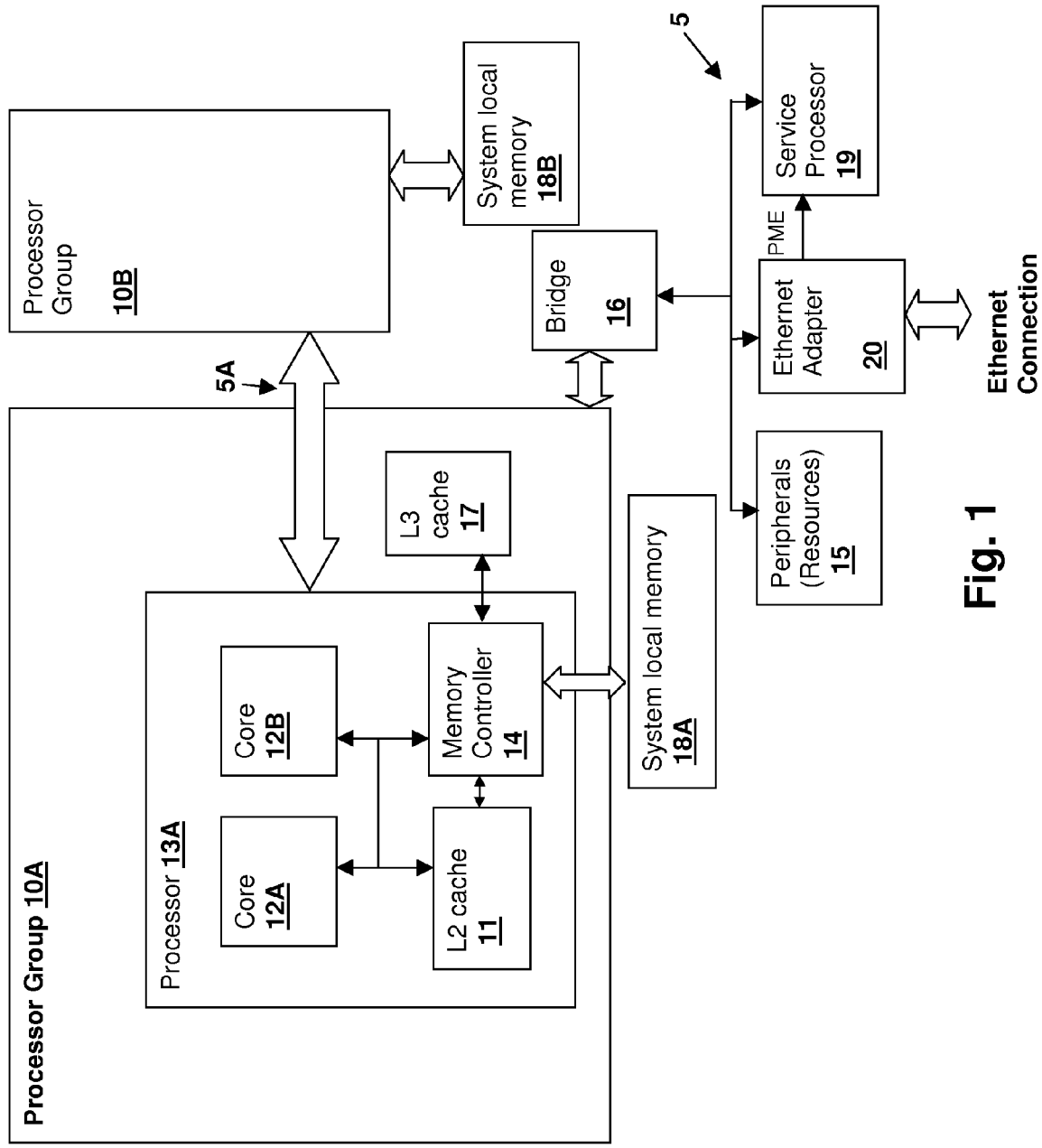
FIG. 1 is a block diagram of a computing system in accordance with an embodiment of the present invention.

With reference now to the figures, and in particular with reference to FIG. 1, there is depicted a block diagram of a processing system in accordance with an embodiment of the present invention. It should be understood that the depicted embodiment is not intended to be limiting, but only exemplary of the type of processing system to which the methods and structures of the present invention may be applied. The system includes a processor group 10A having two cores 12A and 12B and coupled to another processor group 10B by a high-speed dedicated interface 5A. Processor group 10A is connected to peripherals (hardware resources) 15 via a bridge 16. Cores 12A and 12B provide instruction execution and operation on data values for general-purpose processing functions.

Processor group 10A also includes an L3 cache unit 17, a shared L2 cache unit 11 and a memory controller 14. Each processor group 10A, 10B is coupled to separate associated local system memory 18A, 18B and can access any system memory via the various interconnections. However, to maintain low latencies, program instructions for execution by processor 13A are generally stored in system local memory 18A so that values from system local memory can be loaded into caches 11 and 17 as quickly as possible. Other global system memory may be coupled external to bridge 16 for symmetrical access by all processor groups.

PCI bus 5 couples the various peripherals 15, as well as a service processor 19 to bridge 16. Bridge 16 is also coupled by bus 5 to an Ethernet adapter configured in accordance with an embodiment of the present invention. Service processor 19 provides fault supervision, startup assistance and test capability to processor groups 10A and 10B. Service processor 19 also performs functions in accordance with a method of the invention by executing program instructions within the system of the present invention.

Within system local memory 18A and or 18B, a virtual machine monitor program, or "hypervisor" provides support for execution of multiple virtual machines (VMs) or "partitions" that each provide an execution environment for an operating system and a number of "guest" programs (applications and services executed by an operating system and running in the associated VM).

The present invention concerns the management of ownership of Ethernet adapter 20 and in particular a mechanism for managing Wake-On-LAN events that occur due to reception of a Wake-On-LAN packet received by Ethernet adapter 20 over the Ethernet connection. While the illustrative embodiment is directed toward Wake-On-LAN handling in a multi-virtual machine environment, it should be understood that the techniques disclosed and claimed herein can be applied to other adapters and connections for which an external stimulus is intended to result in a power management state change with respect to the owning virtual machine.

Figure 2:
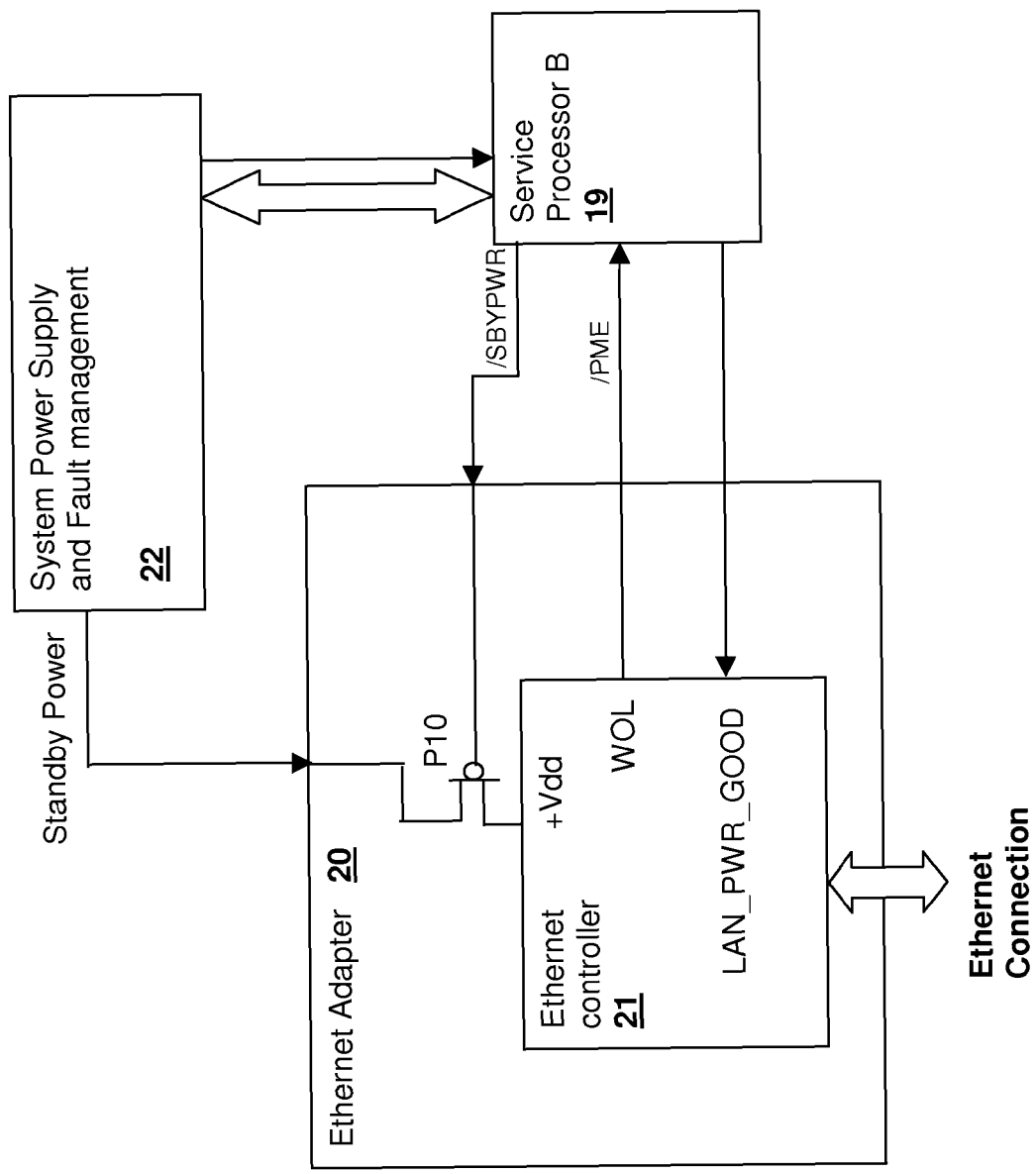
FIG. 2 is a block diagram showing details of the connection of network adapter 20 of FIG. 1.

Referring now to FIG. 2, details of Ethernet adapter 20 and the configuration thereof are illustrated. Ethernet adapter 20 includes an Ethernet controller 21, such as the i82546 Dual Gigabit Ethernet adapter manufactured by Intel Corporation. Ethernet adapter 20 is modified from a standard adapter design for the purposes of the present invention, as transistor P10 is included to interrupt the voltage supplied to Ethernet Adapter 20 from a standby power output of the system power supply and fault management block 22. Standby power (as opposed to primary system power) is used to provide power to Ethernet adapter 20, as in order to support Wake-On-LAN capability, Ethernet adapter 20 requires power even when the overall system is otherwise shut down.

The hypervisor routines used to transfer adapter ownership and initialization generally manage power supplied to adapters and further manages isolation of PCI adapters and/or slots (known as "fencing off" the adapter or slot), generally with the assistance of service processor 19. In the present system, however, the standby power supplied to Ethernet adapter 20 is not interrupted unless power is completely removed from the system (generally by unplugging the system, as the power switch does not interrupt the standby power supply). Therefore, transistor P10 is included in the present invention so that standby power may be removed in order to reset the state of Ethernet controller 21. While the above-described technique will reset any Ethernet controller, some Ethernet controllers (such as the above-mentioned i82546) can be completely reset by the cycling of a signal that indicates a "Power Good" condition (LAN_PWR_GOOD), in which case the standby power control may be omitted or used in combination with power control transistor P10 as shown. If power is removed from Ethernet controller 21 in order to reset it, then the hypervisor manages the isolation of the bus connection by informing the driver that manages bridge 16, to isolate the bus interface connected to Ethernet adapter 20 before and while transistor P10 is turned off.

Conventionally, the LAN_PWR_GOOD signal is connected to an output of system power supply and fault management block 22 and does not have to be cycled, just as the standby power to Ethernet controller 21 can be conventionally present at all times. However, in the present invention, since the state of Ethernet controller 21 must be reset when transferring ownership of Ethernet adapter 20 between virtual machines, a different configuration is employed. In the depicted embodiment present invention, Service Processor 19 controls transistor P10 and the LAN_PWR_GOOD signals under direction of the hypervisor, so that one or the other of the above-described techniques may be used to reset the state of Ethernet controller 21 when transferring ownership of Ethernet Adapter 20.

Further, in the depicted embodiment, the WOL signal that is used by Ethernet controller 20 is connected to Service Processor 19, generally via an interrupt input. In conventional systems, the WOL signal is connected directly to system power supply and fault management block 22 in order to cause system power supply and fault management block 22 to restore power to the system from a power-down condition. However, in the present invention, as full system power may be present and only the owning virtual machine may be in a power-down, standby or other off-line power management state, the WOL signal is not used to control system power supply and fault management block 22 directly, but instead is directed to service processor 19, which will signal system power supply and fault management block 22 to restore power to the system if necessary and if service processor 19 determines that power should be restored.

Service processor 19 also has the ability via the hypervisor, to notify the owner virtual machine of a power management event. Therefore, a Wake-On-LAN event (or other peripheral connection wakeup event) can be completely simulated with respect to the owner virtual machine. By placing control of the peripheral connection wakeup signal processing with service processor 19, great flexibility is achieved with respect to ownership transfer and the manner in which the wakeup is permitted to affect overall system operation.

Figure 3:
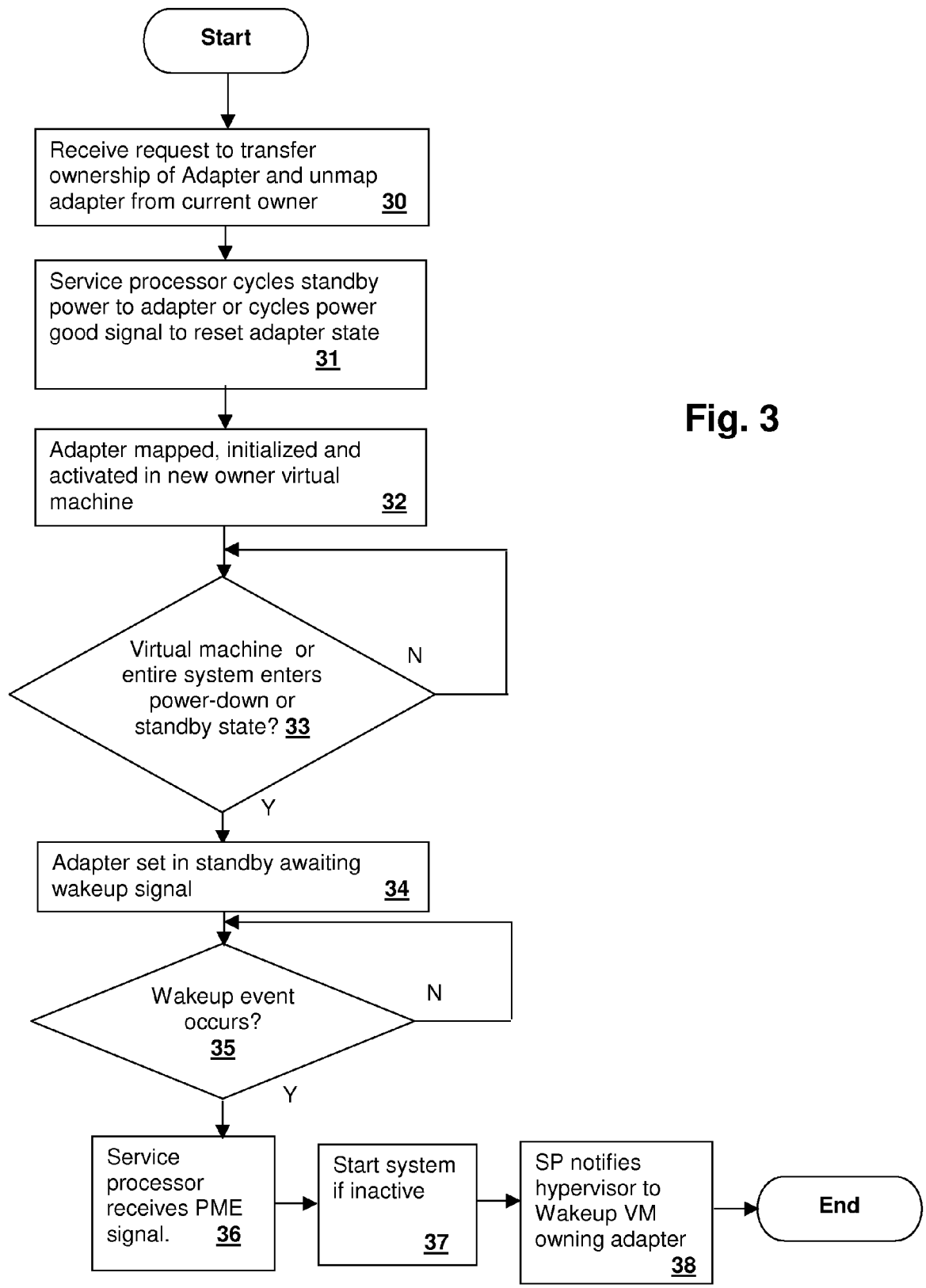
FIG. 3 is a flowchart depicting a method in accordance with an embodiment of the present invention.

Referring now to FIG. 3, a method in accordance with an embodiment of the invention is depicted. The hypervisor controls ownership of the adapter having the wakeup facility and when requested by the system management console or other application having permission to transfer the ownership of Ethernet adapter 20 (step 30), the hypervisor unmaps Ethernet adapter 20 from the current owner virtual machine then directs service processor 19 to cycle standby power to Ethernet adapter 20 and/or cycle the power good signal to reset the adapter state (step 35). If the system is waking up (i.e., the hypervisor is not controlling the exchange), then service processor 19 directly controls the reset of the adaptor via standby power cycling and/or controlling the power good signal. It should be noted that some Ethernet controllers may support a specific state reset input rather than performing a reset in response to a power good signal, and for those controllers, service processor 19 is configured to control the reset input and cycles the reset input during wake-up and during transfer of the adapter between virtual machines, generally under direction of the hypervisor.

After the operations above, Ethernet adapter 21 is mapped, initialized and activated in the new owner virtual machine (step 32). When the owner virtual machine (or the entire system) enters a power-down or standby state (decision 33), Ethernet adapter 21 is set in standby awaiting the wakeup signal (step 34), which may involve loading another microcode set (for handling the wakeup event) into Ethernet adapter 20. When a wakeup event occurs (decision 35), service processor 19 receives the power management event signal (step 36). If the entire system is in standby/power-down, service processor 19 restores power to the overall system and loads the hypervisor. Alternatively, if the system is otherwise operational, but an owning virtual machine is in standby/power-down waiting for the wakeup event, then the hypervisor loads or otherwise activates the owning virtual machine (step 37). Finally, hypervisor notifies the virtual machine that owns Ethernet adapter 20 about the wakeup event (step 38). It should be noted that the above-described process presumes that a particular virtual machine owns Ethernet controller 21 in order for the Wake-On-LAN event to be handled. However, the hypervisor may also "own" Ethernet adapter 20 for purposes of detecting the Wake-On-LAN event, and in that case, the event will not be directed to a particular virtual machine. Also, if the entire system is in the standby/power-down state then service processor 19 in essence is the "owner" of Ethernet adapter 20 for the purposes of waking-up/restarting the system after a Wake-On-LAN packet has been received, at which time ownership of Ethernet adapter 20 is held by the hypervisor or passed to a designated virtual machine by the hypervisor.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of managing a peripheral connection wakeup mechanism in a processing system, said processing system supporting execution of multiple operating system images within multiple virtual machines, said method comprising:
    receiving a wakeup request at an adapter via said peripheral connection;
    signaling a service processor that said wakeup request has been received;
    notifying a virtual machine manager program managing said multiple virtual machines that said service processor has been signaled; and
    controlling the power management state of a particular virtual machine owning said adapter via said virtual machine manager program in response to said notifying, wherein said controlling is performed independently from a control of power management states of other virtual machines capable of ownership of said adapter.

2. The method of claim 1, wherein said adapter is an Ethernet adapter, said wakeup request is a Wake-on-LAN packet, wherein said receiving further comprises decoding said Wake-on-LAN packet, and wherein said signaling is performed responsive to said decoding.

3. The method of claim 2, wherein said indication is a power management signal output by said Ethernet adapter and said signaling comprises activating said power management signal to interrupt said service processor.

4. The method of claim 1, wherein said controlling places said virtual machine in power-up state and further comprising:
    determining whether or not said processing system is in a power-down state; and
    responsive to determining that said processing system is in a power down state, restoring said processing system to a power-up state prior to placing said virtual machine in a power up state.

5. The method of claim 1, wherein said controlling activates said virtual machine by placing said virtual machine in power-up state, and further comprising determining whether or not said virtual machine owning said adapter should be activated in conformity with a system management policy of said virtual machine manager program, and wherein said controlling is performed only in response to determining that said virtual machine owning said adapter should be activated.

6. The method of claim 1, further comprising transferring ownership of said adapter from a first one of said virtual machines to a second one of said virtual machines.

7. The method of claim 1, wherein said resetting is performed by cycling all power to said adapter, including cycling standby power used for detection of said power management request.

8. The method of claim 1, wherein said resetting is performed by cycling a power good indication provided to said adapter, whereby a controller within said adapter self-resets.

9. A processing system comprising:
    a memory for storing program instructions and data;
    a processor for executing said program instructions, said program instructions including multiple operating systems executing within multiple virtual machines, wherein said program instructions further comprise hypervisor program instructions for managing said virtual machines;
    a service processor coupled to said processor and having a memory containing service processor program instructions for providing hardware assistance to said hypervisor program and for managing system functions when said hypervisor is not executing; and
    an adapter for receiving a peripheral connection, said peripheral connection operative to transfer a wakeup indication, wherein said adapter has an output for indicating receipt of said wakeup indication coupled to an input of said service processor for indicating to said service processor that said wakeup indication has been received, and wherein said service processor program instructions comprise program instructions for notifying said hypervisor that said wakeup indication has been received responsive to output of said adapter, and wherein said hypervisor program instructions comprise program instructions for controlling the power management state of a particular virtual machine owning said adapter in response to said notification from said service processor, wherein said controlling is performed independently from a control of power management states of other virtual machines capable of ownership of said adapter.

10. The processing system of claim 9, wherein said adapter is an Ethernet adapter, said wakeup request is a Wake-on-LAN packet, wherein adapter comprises a decoder for decoding said Wake-on-LAN packet, and wherein output is activated responsive to said decoding.

11. The processing system of claim 10, wherein said adapter output is a power management signal output by said Ethernet adapter and said service processor input is an interrupt input.

12. The processing system of claim 9, wherein hypervisor program instructions further comprise instructions for placing said owning virtual machine in power-up state, and wherein said service processor program instructions further comprise program instructions for determining whether or not said processing system is in a power-down state, and responsive to determining that said processing system is in a power down state, restoring said processing system to a power-up state prior to notifying said hypervisor that said wakeup indication has been received.

13. The processing system of claim 9, wherein said hypervisor program instructions activate said owning virtual machine by placing said owner virtual machine in power-up state, and further comprising program instructions for determining whether or not said owning virtual machine should be activated in conformity with a system management policy of said hypervisor, and wherein said hypervisor program instructions for controlling are executed only in response to determining that said owning virtual machine should be activated.

14. The processing system of claim 9, wherein said hypervisor program instructions further comprise program instructions for transferring ownership of said adapter from a first one of said virtual machines to a second one of said virtual machines.

15. The processing system of claim 14, further comprising a standby power switch for controlling standby power to said adapter while standby power is still available to said processing system, and wherein said program instructions for resetting direct said service processor to reset said adapter and wherein said service processor program instructions further comprise program instructions for cycling all power to said adapter including deactivating standby power to said adapter by deactivating said standby power switch.

16. The processing system of claim 14, wherein said program instructions for resetting direct said service processor to reset said adapter and wherein said service processor program instructions further comprise program instructions for cycling a power good indication provided to said adapter from said service processor, whereby a controller within said adapter self-resets in response to said cycling.

17. A computer program product comprising a computer readable storage device encoding program instructions for execution within a processing system supporting execution of multiple operating system images executing within multiple virtual machines, wherein said program instructions comprise hypervisor program instructions for managing said virtual machines, and wherein said hypervisor program instructions comprise program instructions for:
receiving a notification from a service processor that a wakeup indication has been received by an adapter coupled to said service processor;
determining whether or not to activate a particular virtual machine owning said adapter in conformity with a system management policy; and
responsive to determining that said owning virtual machine should be activated, activating said virtual machine, wherein said activating is performed independently from control of other virtual machines capable of ownership of said adapter.

18. The computer program product of claim 17, wherein said hypervisor program instructions further comprising program instructions for transferring ownership of said adapter from a first one of said virtual machines to a second one of said virtual machines.

19. The computer program product of claim 17, wherein said hypervisor program instructions for activating activate said owning virtual machine by placing said owner virtual machine in power-up state, and wherein said hypervisor program instructions further comprise program instructions for determining whether or not said owning virtual machine should be activated in conformity with a system management policy of said hypervisor, and wherein said hypervisor program instructions for activating are executed only in response to determining that said owning virtual machine should be activated.

20. The computer program product of claim 17, wherein said adapter is an Ethernet adapter, said wakeup indication is in sent from said service processor in response receiving a Wake-on-LAN packet at said Ethernet adapter.

21. A computer system, comprising:
a memory for storing program instructions and data;
a processor for executing the program instructions, the program instructions including multiple operating systems executing within multiple virtual machines, wherein the program instructions further comprise hypervisor program instructions for managing the virtual machines;
a service processor coupled to the processor and having a memory containing service processor program instructions for providing hardware assistance to the hypervisor program and for managing system functions when the hypervisor is not executing;
an adapter for receiving a peripheral connection, the peripheral connection operative to transfer a wakeup indication, wherein the adapter has an output for indicating receipt of the wakeup indication coupled to an input of the service processor for indicating to the service processor that the wakeup indication has been received; and
means for notifying the hypervisor that the wakeup indication has been received by the adapter and controlling the power management state of a particular virtual machine owning the adapter.

* * * * *